United States Patent [19]

Mijatovic

[11] 4,184,181

[45] Jan. 15, 1980

[54] METHOD AND DEVICE FOR TRACKING VIDEO SIGNALS ON A MAGNETIC TAPE BY DETECTING PHASE JUMPS

[75] Inventor: Ljubivoje Mijatovic, Nuremberg, Fed. Rep. of Germany

[73] Assignee: Grundig E. M. V. Elektro-Mechanische Versuchsanstalt Max Grundig, Fuerth, Del.X

[21] Appl. No.: 903,219

[22] Filed: May 5, 1978

[30] Foreign Application Priority Data

Jul. 28, 1977 [DE] Fed. Rep. of Germany ....... 2734007

[51] Int. Cl.² ...................... G11B 15/52; G11B 27/30
[52] U.S. Cl. ........................................ 360/77; 360/70; 360/73
[58] Field of Search .............................. 360/70, 73, 77

[56] References Cited

U.S. PATENT DOCUMENTS

| | | | |
|---|---|---|---|
| 3,959,815 | 5/1976 | Rotter et al. | 360/73 |
| 3,964,094 | 6/1976 | Hart | 360/77 |
| 4,007,492 | 2/1977 | Rose | 360/73 |
| 4,014,040 | 3/1977 | Kornhaas | 360/77 |
| 4,044,388 | 8/1977 | Metzger | 360/77 |
| 4,074,328 | 2/1978 | Hardwick | 360/77 |

*Primary Examiner*—Stuart N. Hecker

[57] ABSTRACT

A method and device for maintaining an exact track when playing back video signals, which are recorded on a magnetic tape in oblique parallel tracks with different azimuth angles.

7 Claims, 3 Drawing Figures

METHOD AND DEVICE FOR TRACKING VIDEO SIGNALS ON A MAGNETIC TAPE BY DETECTING PHASE JUMPS

BACKGROUND OF THE INVENTION

When recording video signals in oblique parallel tracks cross-talking from track to track can be kept to a minimum if the tracks are separated by guard bands. However, such guard bands are a poor way of using the available recording face.

Another possibility for minimizing cross-talk is to record with azimuth angles which differ from track to track. In such a case the guard bands can be eliminated. However, in such a system the requirement for exactly scanning the recorded track is increased.

Methods and devices for an automatical tracking during play-back of video signals in oblique tracks are known, but were never attractive for incorporation into devices for home use. For example it has been suggested to use the time difference which occurs simultaneously with a migration as a measure of the lateral migration of the replay head from the magnetic track. This method can be accomplished by very simple circuitry but poses high demands with respect to the precision and the timely constancy of such circuits, because very small and continuously changing time intervals must be measured.

SUMMARY OF THE INVENTION

The subject invention provides a device and a method wherein an exact tracking is made possible without expensive equipment and without significant requirements for precision, durability and consfancy of the circuit elements.

The invention is related to video tape recorders where the video signals are recorded in oblique parallel tracks which are alternately recorded and replayed by two rotating video heads with gaps having opposite azimuth angles. The migration of the video heads from the exact track position is determined by the phase jump which occurs during track change.

The invention is based on the realization that the sudden change of a magnitude is easier to measure than a continuous change.

DESCRIPTION OF A PREFERRED EMBODIMENT

Figure 1:
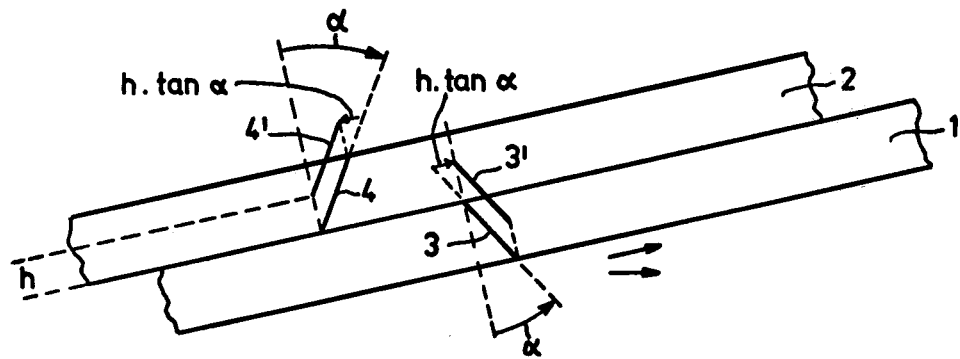
FIG. 1 is a diagrammatic representation of two oblique tracks with the tape scanning and tape feeding directions indicated.

FIG. 1 shows two oblique tracks 1 and 2. For track 1 the recording and replay gap of the magnet head is turned from the vertical position counterclockwise through angle $\alpha$ and for track 2 in a clockwise direction through an equal angle $\alpha$. If during replay the heads are displaced from the nominal position 3, 4 into position 3', 4' by an amount h perpendicular to the track direction, an additional phase change occurs in addition to the reduction of the signal to noise ratio. With the scanning and tape feeding directions and with the azimuth angles of FIG. 1 head 3' scans the video signal by an amount (h) (tan $\alpha$) earlier and head 4' by an amount (h) (tan $\alpha$) later than at nominal position. Therefore, during the change from track 1 to track 2 a sudden phase jump takes place corresponding to (2) (h) (tan $\alpha$) rearwardly and from track 2 to track 1 forwardly. However, if heads 3 and 4 are not migrating upwardly as shown in FIG. 1 but rather downwardly, the sudden phase jump takes place with the magnitude (2) (h) (tan $\alpha$) forwardly and from track 2 to track 1 rearwardly. Therefore, the magnitude of the phase jump is a measure of the magnitude of migration of the video heads from the track, while the sign of the phase jump determines the direction of migration.

Figure 2:
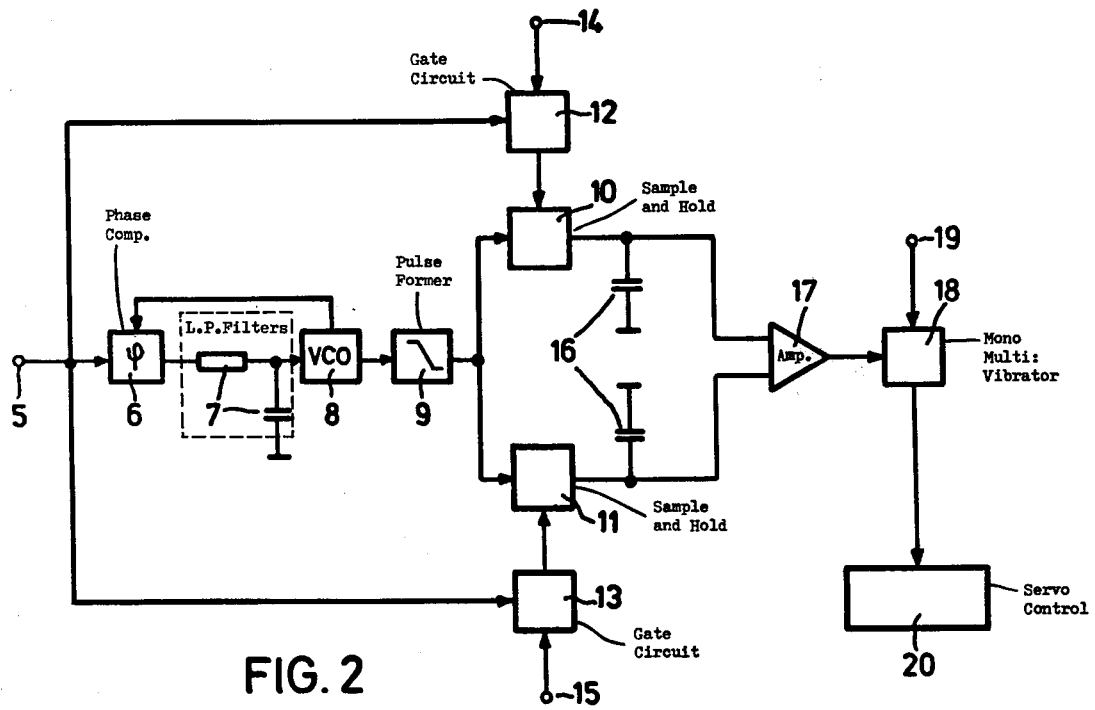
FIG. 2 is a schematic diagram utilizing the subject invention.

In the invention the phase jump is measured at the line frequency with respect to a reference oscillation which is synchronized to the line frequency but which cannot follow sudden phase jumps or rapid frequency changes. For this purpose a voltage controlled oscillator 8 is provided as can be seen in FIG. 2 which oscillates at about double the line frequency and which is synchronized by means of phase comparator 6 and low pass filter 7 to the line pulses fed at 5 and separated from the scanned video signal. The double line frequency is chosen because of the frequency of the equalizing pulses of the vertical signal, and the low pass filter 7 prevents oscillator 8 from following immediately the occuring phase jumps.

Simultaneously, the scanned line pulses are fed to gate circuits 12 and 13 which open for a short time for about two line durations after each second head change. The necessary opening pulses are fed at 14 and 15 and are derived from the position pulse of the head wheel, so that gate 12 opens when changing from track 1 to track 2, for example, while gate 13 opens when changing from track 2 to the next track.

It is useful to transform the output voltage of oscillator 8 into a trapezoidal wave by pulse former 9 the output of which is fed as a reference to the sample and hold circuits 10 and 16 or 11, 16, respectively. The output signals of 10 and 11 are coupled to the input of differential amplifier 17.

The error signal which is generated at the output of the differential amplifier 17 may be used for making an exact track adjustment for the video heads. For example, the error signal may influence the recovery time of a monostable multivibrator 18 to which the reference pulses for the servo control circuit 20 of the tape transport motor are fed at 19. Another possibility exists in the immediate adjustment of the rotating video heads in axial direction by means of piezoceramic elements which are excited by the error signal of differential amplifier 17.

Since the maintaining of the track and the transport speed for the tape are unmistakeably correlated in accordance with the invention the reference pulses which are fed at 19 may be omitted in accordance with a further embodiment of the invention. In other words, the usual synchronous track is not necessary.

Figure 3:
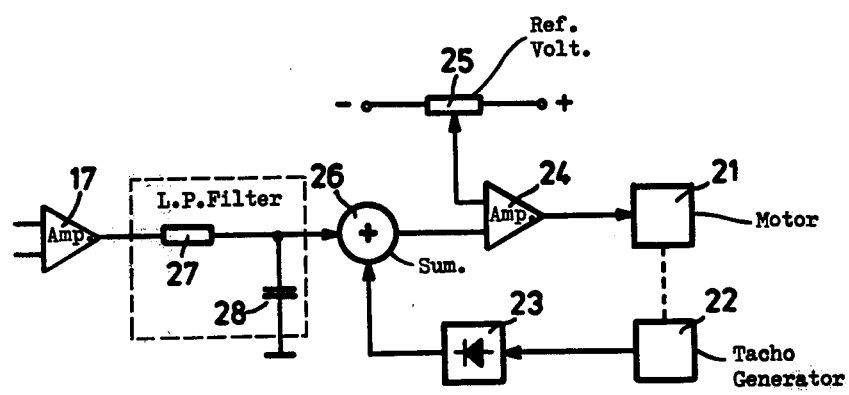
FIG. 3 is a schematic diagram illustrating a further embodiment of the invention.

In accordance with FIG. 3, the servo control circuit of band feeding motor 21 includes tacho generator 22 which is coupled with motor 21, and the output voltage of the generator after being rectified at 23 is coupled to the input of a differential amplifier 24. The other input of differential amplifier 24 is coupled to a reference voltage 25. This control loop controls the tape feeding speed approximately to the nominal value, while the output voltage of the differential amplifier 17 which is fed into the summing element 26 provides the exact adjustment of the tape speed with respect to the exact track adjustment.

The additional low pass filter 27, 28 is only necessary for the start of the tape movement and elimates the big alternating phase jumps generated during the acceleration of the magnetic tape.

I claim:

1. A device for adjusting the exact position of the track when replaying video signals which are recorded in oblique parallel tracks on a magnetic tape, said oblique tracks being alternately recorded and replayed by two rotating heads, the gaps of which have opposite equal azimuth angles causing phase jumps of the line frequency of the scanned video signal during track changes in case of mistracking, said device including means for detecting said phase jumps, and means for applying said phase jumps to said rotating heads to readjust the rotating video heads to the exact track position by control of the tape speed.

2. A device in accordance with claim 1 further comprising means for measuring the phase jumps of the line frequency for changes from an even numbered to an odd numbered track and for changes from an odd numbered to an even numbered track.

3. A device in accordance with claim 2 in which the phase jumps of the line frequency of the video signal with respect to a reference frequency during subsequent track changes are detected by different sample and hold circuits, the outputs of said sample and hold circuits being fed to the input of a differential amplifier to form an error signal, said error signal controlling the tape speed so as to minimize said error signal.

4. A device according to claim 2 further comprising a phase locked loop to produce the reference frequency synchronized to the line frequency of the scanned video signal, said phase locked loop containing a phase comparator, a voltage controlled oscillator and a low pass filter therebetween, said low pass filter causing the control time constant of the voltage controlled oscillator to equal at least the scanning time of one track.

5. A device according to claim 3 in which the separated line pulses from the scanned video signal are fed through gate circuits to the sample and hold circuits, and which are alternately opened for about two line intervals by pulses which are derived from the position signals of the head wheel each time a video head starts to scan a new track.

6. A device according to claim 5 in which the error signal of the differential amplifier is added to or subtracted from the rectified voltage of the tacho generator of the tape feed motor and in which by comparing the sum or difference, respectively, with a given reference voltage the rotation of the tape feed motor is controlled so as to minimize the error voltage produced by the differential amplifier.

7. A device according to claim 6 in which a low pass filter is provided at the output of the differential amplifier.

* * * * *